Jan. 12, 1965 G. H. SPENCER 3,165,204
PAIR OF BOOK ENDS
Filed April 7, 1964

INVENTOR
George H. Spencer
BY Spencer & Kaye
ATTORNEYS 3,165,204
PAIR OF BOOK ENDS
George H. Spencer, 4731 30th St. NW.,
Washington, D.C.
Filed Apr. 7, 1964, Ser. No. 357,903
5 Claims. (Cl. 211—42)

The present invention relates to a pair of book ends, it being the object of the present invention to provide a set of book ends which are connected to each other, thereby to prevent loss or theft of any one book end, it being another object of the present invention to provide a set of book ends which are configured to provide a pleasant appearance.

With the above objects in view, the present invention resides in a set of book ends which are connected to each other by a flexible loop that loops over the book ends as well as over such books as happen to be between the book ends. According to a preferred embodiment of the invention, one of the book ends is provided with a mass configured to represent the front portion of an animal while the other book end is provided with a mass configured to represent the rear portion of the animal. The front of the animal has a mouth, while the rear has a tail, and the loop is connected to the rear portion to form a continuation of the tail, the other end of the loop extending into the mouth of the front portion, thereby to simulate the swallowing of the tail by the animal.

Additional objects and advantages of the present invention will become apparent upon consideration of the following description when taken in conjunction with the accompanying drawings in which.

Figure 1:
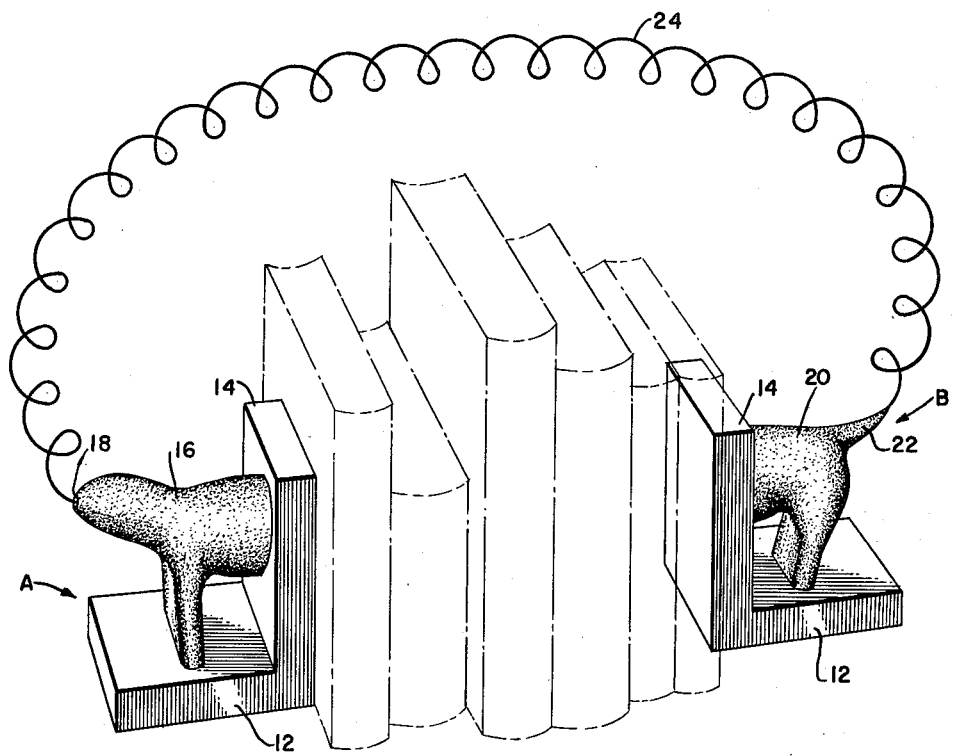
FIGURE 1 is a perspective view of a pair of book ends according to the present invention.

Referring now to the drawings and to FIGURE 1 thereof in particular, the same shows two book ends A and B, each having a horizontal part 12 with which the book end stands on a surface and a vertical part 14 adapted to lie against a book standing on the surface. FIGURE 1 shows the book ends as standing at a distance from each other, with their respective vertical parts 14 being directed toward each other. A number of books are shown as standing between the book ends.

The book end A is provided with a mass 16 configured to represent the front portion of an animal, e.g., a dog, and has an opening 18 representing the mouth, while the book end B is provided with a mass 20 configured to represent the rear portion of the animal. The mass 20 has a tail 22.

The book ends are interconnected with each other by means forming a flexible loop 24. This loop, which may be in the form of a coil spring or a more or less stiff wire, is connected to the book end B at the tail 22 so as to form a continuation of the tail, while the other end of the loop 24 is connected to the mouth 18 of the mass 16 of book end A, thereby to simulate swallowing of the tail by the animal.

Figure 2:
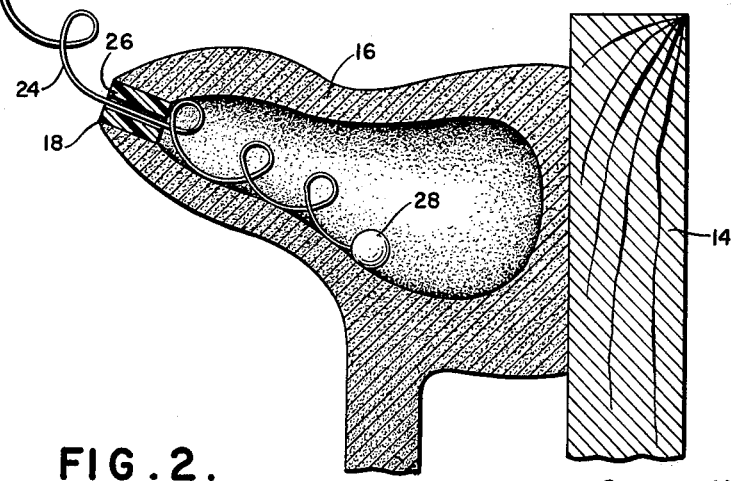
FIGURE 2 is a sectional view showing a detail.

As shown in FIGURE 2, the loop 24 may be slidably received in the mouth 18, thereby to permit adjustment of the external length of the loop, depending on the number and/or the height of the books between the book ends. FIGURE 2 shows the end of the loop as being frictionally received in opening 18, there being a suitable plastic sleeve 26 which holds the loop but allows it to be moved into or out of the hollow interior of the mass 16 to a greater or lesser extent. Complete and/or inadvertent removal of the loop is prevented by an enlarged ball 28 affixed to the end of the loop.

The various parts may be made of any suitable material. For example, the vertical and horizontal parts 12, 14 of the book ends can be made of wood, and the masses 16 and 20 of ceramic or plastic.

It will be understood that the above description of the present invention is susceptible to various modifications, changes and adaptations, and the same are intended to be comprehended within the meaning and range of equivalents of the appended claims.

What is claimed is:
1. In combination: two book ends, each having a horizontal part with which the book end stands on a surface and a vertical part adapted to lie against a book standing on the surface; and flexible loop means having one end connected to one of said book ends and the other end connected to the other of said book ends, said loop means, when said book ends are standing with their respective vertical parts being directed toward each other, looping over said vertical parts and over such books as may be positioned between said vertical parts of said book ends.

2. In combination: two book ends, each having a horizontal part with which the book end stands on a surface and a vertical part adapted to lie against a book standing on the surface, one of said book ends being provided with a mass configured to represent the front portion of an animal and having an opening representing the mouth of the animal and the other of said book ends being provided with a mass configured to represent the rear portion of said animal and having a tail; and flexible loop means having one end connected to one of said book ends and the other end connected to the other of said book ends, said loop means, when said book ends are standing with their respective vertical parts being directed twards each other, looping over said vertical parts and over such books as may be positioned between said vertical parts of said book ends, said loop means being connected to said other book end to form a continuation of said tail and to said one book end at said mouth thereby to simulate swallowing of the tail by the animal.

3. The combination defined in claim 2 wherein said mass of said one book end is provided with an opening at said mouth and said loop is slidably received in said opening to permit adjustment of the external length of said loop means.

4. The combination defined in claim 3 wherein said loop means is frictionally received in said opening.

5. The combination defined in claim 1 wherein means are provided on one of said book ends for slidably receiving said loop means, thereby to permit that portion of the length of said loop means which extends between said two book ends to be adjusted.

References Cited by the Examiner
UNITED STATES PATENTS

| D. 132,946 | 7/42 | Weil | 33—1 |
|---|---|---|---|
| D. 158,057 | 4/50 | Engel | 211—42 |
| 314,436 | 3/85 | Crocker | 211—43 |
| 1,682,053 | 8/28 | Rush | 211—43 |
| 2,605,907 | 8/52 | Hirst | 211—120 |

FOREIGN PATENTS
629,343   9/49   Great Britain.

CLAUDE A. LE ROY, Primary Examiner.